United States Patent [19]

Epstein

[11] 4,059,831
[45] Nov. 22, 1977

[54] PASSIVE TRANSPONDERS USING ACOUSTIC SURFACE WAVE DEVICES

[75] Inventor: Max Epstein, Highland Park, Ill.

[73] Assignee: Northwestern University, Evanston, Ill.

[21] Appl. No.: 617,251

[22] Filed: Oct. 6, 1975

[51] Int. Cl.² .................................................. G01S 9/56
[52] U.S. Cl. .................................. 343/6.8 R; 333/30 R
[58] Field of Search .................... 343/6.5 SS, 6.8 R; 333/30 R

[56] References Cited

U.S. PATENT DOCUMENTS

| 3,169,242 | 2/1965 | Davis et al. | 343/6.5 SS |
| 3,609,416 | 9/1971 | Epstein | 333/30 R |
| 3,706,094 | 12/1972 | Cole et al. | 343/6.5 SS |
| 3,946,342 | 3/1976 | Hartmann | 333/30 R |

Primary Examiner—T.H. Tubbesing
Assistant Examiner—T. M. Blum
Attorney, Agent, or Firm—Michael G. Berkman

[57] ABSTRACT

A passive transponder sensitive to electromagnetic pulses received in the form of surface acoustic waves. The device utilizes a plurality of interdigital transponders each consisting of a metallic deposit on a piezoelectric substrate and serving as an electrode. Transponder deactivation and energy interruption means provide programability and coding.

4 Claims, 4 Drawing Figures

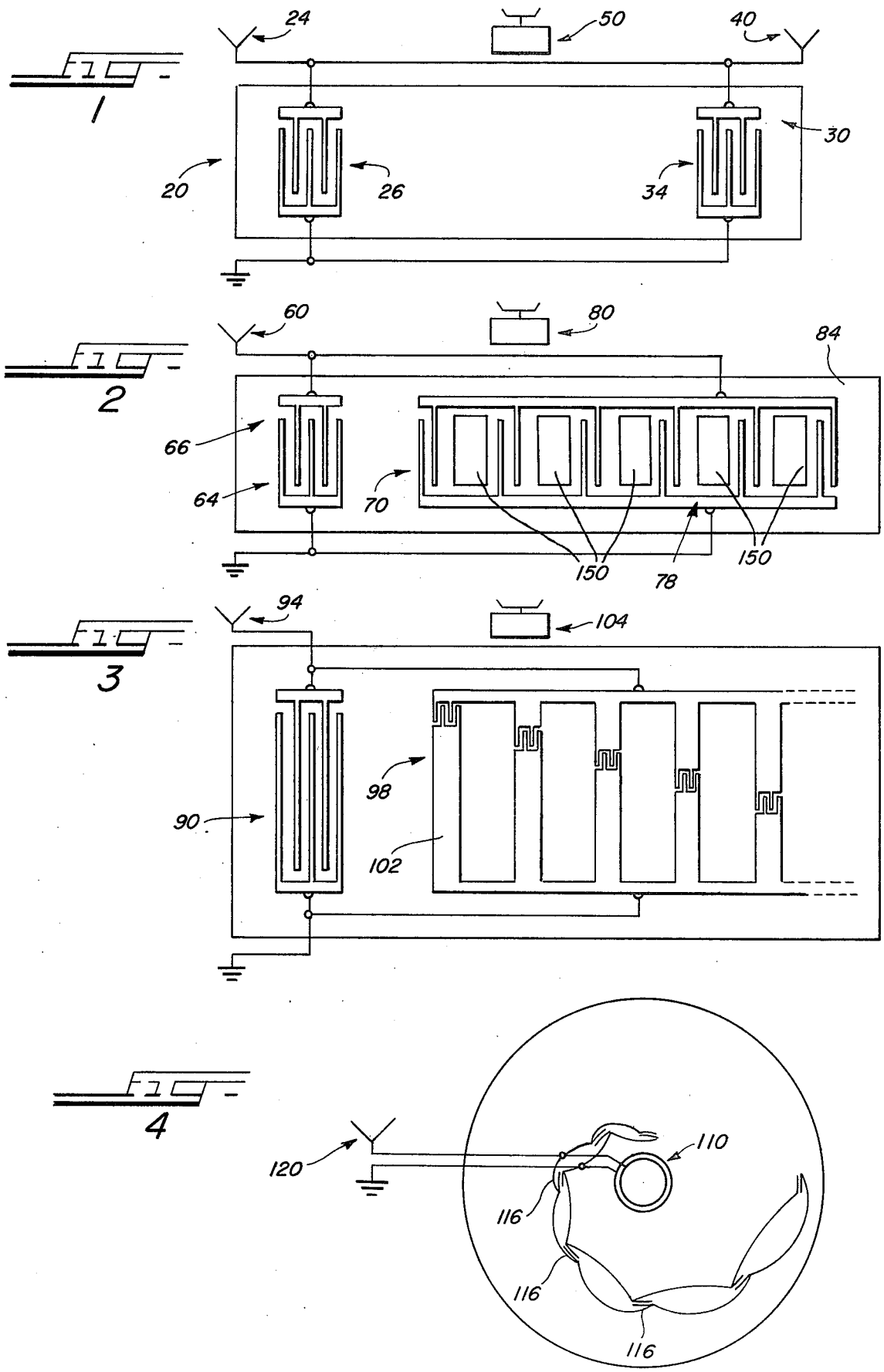

PASSIVE TRANSPONDERS USING ACOUSTIC SURFACE WAVE DEVICES

BACKGROUND OF THE INVENTION

This invention relates to transponders, devices which, upon receiving a predetermined interrogate signal, respond by transmitting desired information to a receiver. More particularly, the invention is directed to passive transponders for use with acoustic surface waves.

Transponders are conventionally used to receive an interrogating signal or signals and then to transmit a response. For example, such devices are widely employed in commercial and military aircraft. Typically, an air traffic controller transmits an interrogation signal to the aircraft-carried responder which then automatically responds giving information such as flight number and altitude. This information enables the ground station to distinguish between and to identify aircraft. Transponder systems are also employed for vehicle or personnel detection and identification.

Existing transponders systems are costly to produce, especially where a delay signal is required. Such signal delay enables one to discriminate the desired signal from the reflected radio waves, clutter or background.

Passive transponders can also discriminate against reflected radio waves without using signal delay. For example, non-linear diodes can be used for discriminating clutter signals from the desired signal. In operation, the non-linear diodes receive a predetermined signal at one frequency causing the generation of other frequencies, or harmonics, which may be distinguished from the original signal and background clutter by virtue of frequency. While the non-linear diode signal discriminators are inexpensive to make, they are very inefficient in converting energy into other frequencies. Moreover, this method of signal discrimination is impaired by generation of similar harmonics in the transmitter and receiver and in other objects containing non-linear scattering mechanisms. It is, accordingly, the aim of the present invention to provide an improved passive responder which avoids the deficiencies and shortcomings of prior art systems.

SUMMARY OF THE INVENTION

The present invention relates to a new and useful device for discriminating desired transponded signals from clutter signals through the expedient of an elastic surface wave delay line. Transponders using elastic wave techniques can be manufactured inexpensively and can be used in a broad variety of applications heretofore impractical because of the prohibitive cost of existing systems.

It is a principal object of this invention to provide a signal delay in a transponder device by means of elastic wave propagation.

Another object is to provide an inexpensively manufactured transponder device which will discriminate effectively and reliably between selected interrogation signals.

Still another object is to provide a transponder capable of generating its own unique signal.

A related object is to provide a passive transponder device capable of generating its own unique signal which, thereupon, provides alternative or additional means for identificaton and discrimination.

Other and further objects, features, and advantages, of the invention will become apparent upon consideration of the following descriptive material in conjunction with the drawings.

BRIEF DESCRIPTION OF THE DRAWINGS

The invention is described more fully and in greater detail herebelow by way of specific examples with reference to the accompanying drawings, in which:

FIG. 1 is a diagrammatic representation of an acoustic surface wave delay line using interdigital transducers, in accordance with the invention;

FIG. 2 depicts a tapped delay line in accordance with the invention and including programming means;

FIG. 3 shows a modified acoustic surface wave delay line, according to the invention; and FIG. 4 illustrates, schematically, a second embodiment of the invention utilizing a circular input transducer.

As stated, many types of signal delay may be utilized in the design of a transponder. Referring now to the drawings, and more particularly to FIG. 1, there is shown, by way of illustrative example, an acoustic surface wave delay line 20 embodying the subject invention. A radio signal from a receiving antenna 24 is applied to a transducer 26 of an array of interdigital transducers deposited on a piezoelectric substrate 30. The transducer 26, converts the received signal into an acoustic surface wave of the same frequency but of greatly reduced (100,000 times) wavelength as compared with electromagnetic waves. The generated acoustic surface wave propagates to a second interdigital transducer 34 and is returned to the original antenna 24 to be transmitted. Alternatively, the delayed signal can also be transmitted to a separate, reply antenna 40. The transmitted signal is then picked up by a remote receiver 50, which may or may not be located near the transmitter.

The effected signal delay provides a means of distinguishing between randomly reflected r.f. signals, commonly known as clutter or background signals, and the desired signal from the transponder. Thus, for example, where the transmitter and receiver are located together and use the same antenna for transmitting and receiving, the receiver must be isolated during the transmission of the r.f. pulse and then subsequently reconnected to the antenna. This transmitter-receiver switching is a well known technique in many applications, notably radar. The time delay at the transponder provides time for this function to be performed electronically The velocity of electromagnetic radiation is approximately 1,000 feet per microsecond. Therefore, passive objects such as walls, trees, or other non-transponding objects within distances less than 1,000 feet will reflect the transmitted waves back to the receiver in a time interval of less than 2 microseconds. Accordingly, a transponder which delays the signal by more than 2 microseconds will ensure that the transmitted signal is distinguished from clutter or background signals.

In accordance with the present invention, elastic surface waves can be tapped during their propagation along the delay line, making possible responses utilizing the same or a different and coded signal, thereby effectively and materially increasing the rejection of background signals. The techniques for building code-recognizing and code-generating elastic wave delay lines are well established in the art. Accordingly, no detailed discussion is provided herein. It is practical to use such systems to provide for discrete addressing and/or responses from a large number of transponders to render feasible the identification of vehicles, packages or other objects through an elected response from each unique transponder. The fabrication techniques are the same as for presently known microelectronics, namely thin film batch processing, which methods may be used to produce units at low cost.

The use of a tapped delay line in the practice of the invention is described with reference to FIG. 2. An r.f. pulse received at a receiving antenna 60 is applied to an input transducer 64 generating an acoustic surface wave on a piezoelectric substrate 66. The wave travels at an approximate velocity of $3.5 \times 10^5$ m/sec. which corresponds to a delay of about 3 microseconds per centimeter. The acoustic surface wave generates an electric signal as it passes each tap 70 of a tapped interdigital transducer 78. The output signals from all the taps are fed to the antenna 60 for retransmission to a receiver 80. The presence or absence of the tap can correspond to the bit designation of a digital code. Thus, an acoustic surface wave delay line with 10 taps spaced further apart than the length of the r.f. pulse provides a 10 bit code capable of distinguishing over a thousand different codes ($2^{10}$ possible combinations). The fabricaton process of such devices can be simplified by producing all the taps, and, thereafter, disconnecting individual taps by scribing off the appropriate connections.

Even though the input and output signals may utilize separate antennae, it is unlikely that the isolation will always be adequate to eliminate interaction between the transmitted amd the received signals. Hence, the output tapped transducers will inevitably generate acoustic surface waves propagating in both directions along the substrate 84. Such interaction materially restricts the available codes.

An arrangement by which the above referred to objectionable interaction is eliminated is shown in FIG. 3. As depicted schematically, there is provided an input transducer 90 which has a large aperture with the individual taps being small. In this arrangement, a signal eminating from the antennae 94 and received at the tapped transducer 98 produces no interaction between the individual taps 102 and the available code combinations remains $2^n$ where n is the number of taps. The output signals may be fed to the antenna 94 for retransmission to a remote receiver 104. A similar scheme can be obtained using piezoelectric substrates with basal plane symmetry, such as films of ZnO or ceramics, e.g. PZT.

In the arrangement shown in FIG. 4, a circular input transducer 110 carried on a piezoelectric substrate 114 generates surface waves which propagate radially to output taps 116 located on the circumference of the circular pattern connected to an antenna 120. The advantage of this method is the higher efficiency of the input transducer 110 which does not radiate bidirectionally as in the case of a one-dimensional structure. Also, the impedances of the transducers in the two-dimensional scheme can be made more compatible with each other. It should be noted that in the arrangement in FIG. 3 and of FIG. 4, as described above, it is required that the tapped transducers all be connected to the antenna as shown. However, it is also possible to use the tapped structures as reflectors which merely send most of the surface acoustic wave back to the input transducer. The advantage of the latter technique is that only one transducer is connected to the antenna, thereby lowering shunt capacity to simplify antenna design at high frequencies.

Another important feature of the surface-acoustic-wave (SAW) passive transponders of the invention is that they may be programmed. One method of such programming is selectively to connect and disconnect the individual taps. Another method, unique to the subject device and most convenient, is to apply pressure to the substrate at zones between the individual taps. For example, an arrangement is provided wherein rubber pads 150 (FIG. 2) are pressed selectively onto the substrate between the taps, effectively preventing the surface acoustic wave from travelling to or from the given transducer. Accordingly the code of the SAW passive transponder may be modified without resort to any electrical connectons.

What is claimed is:

1. A transponder for receiving and for retransmitting pulsed electromagnetic energy characterized by a frequency range of from about 10 meg. Hz to 1000 meg. Hz and comprising:

antenna means for receiving and for transmitting a signal of said pulsed electromagnetic energy, peizoelectric substrate means remote from said antenna means, electrode means carried as an array of electrodes on said peizoelectric substrate means to define therewith an acoustic surface wave device, said device including a plurality of interdigital transducers, electrical energy conducting means interconnecting said antenna means with at least one of said interdigital transducers, said transducers and said substrate means constituting means responsive to a signal received by said transducers from said antenna means to effect a finite time delay in the conductive travel of said signal along said piezoelectric substrate means, thereby to provide a time-delayed signal, said transducers constituting means for transmitting the time-delayed signal to said antenna means, said transducers including a circular input transducer propagating radially and an array of output taps disposed in cyclical succession about said transducer, said output taps being disposed on a circumference of a circular pattern, and means connecting at least one of said output taps to said antenna means, whereby said transducers obviate bi-directional radiation and are compatible with each other.

2. A transponder for receiving and for retransmitting pulsed electromagnetic energy characterized by a frequency range of from about 10 meg. Hz to 1000 meg. Hz and comprising:

means for receiving and for transmitting a signal of said pulsed electromagnetic energy, piezoelectric substrate means, electrode means carried as an array of electrodes on said piezoelectric substrate means to define therewith an acoustic surface wave device, said device including a plurality of interdigital transducers, electrical energy conducting means interconnecting said means for receiving and transmitting a signal with at least one of said interdigital transducers.

said transducers and said substrate means constituting means responsive to a signal received by said transducers to effect a finite time delay in the conductive travel of said signal along said piezoelectric substrate means, thereby to provide a time-delayed signal, said transducers constituting means for transmitting the time-delayed signal, programming means to program said transducers, said programming means consisting essentially of means to inactivate selectively at least one of said transducers by preventing surface wave travel in a zone adjacent thereto, said means to deactivate a transducer comprising pad means overlying said substrate means in a zone adjacent a transducer, whereby pressure applied to said substrate means through said pad means renders said substrate means nonconductive to a surface acoustic wave.

3. The structure as set forth in claim 2 wherein said transducers include a tapped interdigital transducer consisting essentially of spaced taps defining a delay line, and wherein said spaced taps are separated mechanically from one another a distance at least equal to the length of an interrogating r.f. pulse applied thereto.

4. A transponder for receiving and for retransmitting pulsed electromagnetic energy characterized by a frequency range of from about 10 meg. Hz to 1000 meg. Hz and comprising:

means for receiving and for transmitting a signal of said pulsed electromagnetic energy, piezoelectric substrate means, electrode means carried as an array of electrodes on said piezoelectric substrate means to define therewith an acoustic surface wave device, said device including a plurality of interdigital transducers, said transducers and said substrate means constituting means responsive to a signal received by said transducers to effect a finite time delay in the conductive travel of said signal along said piezoelectric substrate means, thereby to provide a time-delayed signal, said transducers constituting means for transmitting the time-delayed signal, programming means to program said transducers, said programming means consisting essentially of pressure means to inactivate selectively at least one of said transducers by preventing surface wave travel in a zone adjacent thereto.

said means to inactivate one of said transducers comprising means selective to connect and disconnect said transducers.

* * * * *